US012407634B2

(12) United States Patent
Li et al.

(10) Patent No.: US 12,407,634 B2
(45) Date of Patent: Sep. 2, 2025

(54) METHOD, APPARATUS, DEVICE AND MEDIUM FOR MESSAGE PROCESSING

(71) Applicant: Beijing Zitiao Network Technology Co., Ltd., Beijing (CN)

(72) Inventors: Xuehan Li, Beijing (CN); Jian Sun, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/761,152

(22) Filed: Jul. 1, 2024

(65) Prior Publication Data
US 2024/0356876 A1 Oct. 24, 2024

Related U.S. Application Data

(63) Continuation of application No. PCT/CN2022/137996, filed on Dec. 9, 2022.

(30) Foreign Application Priority Data

Dec. 30, 2021 (CN) .......................... 202111668814.9

(51) Int. Cl.
G06F 15/16 (2006.01)
H04L 51/04 (2022.01)
H04L 51/214 (2022.01)

(52) U.S. Cl.
CPC ............ *H04L 51/04* (2013.01); *H04L 51/214* (2022.05)

(58) Field of Classification Search
CPC .............................. H04L 51/04; H04L 51/214
(Continued)

(56) References Cited

U.S. PATENT DOCUMENTS 9,887,941 B1 * 2/2018 Guarraci ............. G06F 3/04842
2003/0233410 A1 * 12/2003 Gusler ................. G06Q 10/107
709/206
(Continued)

FOREIGN PATENT DOCUMENTS

CN 103903124 A 7/2014
CN 105049317 A 11/2015
(Continued)

OTHER PUBLICATIONS

International Search Report for International Patent Application No. PCT/CN2022/137996, mailed Feb. 22, 2023 (7 pages).
(Continued)

*Primary Examiner* — Imad Hussain
(74) *Attorney, Agent, or Firm* — Astute IP Law Group

(57) ABSTRACT

The application discloses a method, apparatus, device and medium for message processing. After forwarding a forwarded message formed in a combining and forwarding manner from a source conversation to a target conversation, when a card message in the forwarded message is displayed in the target conversation, a display style of card message in the source conversation is determined. After determining the display style of the card message in the source conversation, the card message is displayed in the target conversation based on the display style. That is, in embodiments of the application, the display style of the card message in the source conversation is obtained, and then the card message in the target conversation is rendered based on the display style, so that the display effect of the card message which is combined and forwarded and the card message in the source conversation is maintained consistent.

18 Claims, 5 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2008/0270560 A1 | 10/2008 | Tysowski et al. | |
| 2014/0223464 A1 | 8/2014 | Moran et al. | |
| 2017/0288887 A1* | 10/2017 | Wang | H04W 4/14 |
| 2017/0364481 A1* | 12/2017 | Scapa | H04L 51/48 |
| 2018/0067628 A1* | 3/2018 | Keel | G06F 16/258 |
| 2024/0106788 A1* | 3/2024 | Liao | H04L 51/046 |

FOREIGN PATENT DOCUMENTS

| | | | | |
|---|---|---|---|---|
| CN | 106202155 A | 12/2016 | | |
| CN | 107302486 A | 10/2017 | | |
| CN | 109120794 A | 1/2019 | | |
| CN | 110457038 A | 11/2019 | | |
| CN | 110572431 A | 12/2019 | | |
| CN | 110912803 A | 3/2020 | | |
| CN | 111131848 A | 5/2020 | | |
| CN | 111796745 A | 10/2020 | | |
| CN | 111931962 A | 11/2020 | | |
| CN | 112286608 A | 1/2021 | | |
| CN | 113076163 A | * | 7/2021 | G06F 9/451 |
| CN | 113495664 A | 10/2021 | | |
| CN | 113595864 A | 11/2021 | | |
| CN | 113746722 A | 12/2021 | | |
| CN | 113761427 A | 12/2021 | | |
| CN | 115022269 A | 9/2022 | | |
| JP | 2013250972 A | 12/2013 | | |
| WO | 2021097328 A1 | 5/2021 | | |
| WO | 2021244154 A1 | 12/2021 | | |

OTHER PUBLICATIONS

The first Office Action for Chinese Patent Application No. 2023112500025500, dated Nov. 25, 2023 (32 pages).

Chen et al., "Smart Card Customization Technology in Geological Data Management", Oil and Gas Field Surface Engineering, vol. 32, No. 05, May 1, 2013.

Office Action for Japanese Patent Application No. 2024-539837, mailed on Jul. 8, 2025, 8 pages.

* cited by examiner

METHOD, APPARATUS, DEVICE AND MEDIUM FOR MESSAGE PROCESSING

This application is a continuation of International Patent Application No. PCT/CN2022/137996, filed on Dec. 9, 2022, which claims priority to Chinese Patent Application No. 202111668814.9, filed on Dec. 30, 2021, and entitled "Method, apparatus, device and medium for message processing", each of which is hereby incorporated herein by reference in its entirety.

FIELD

The present application relates to the field of computers, and in particular, to a method, apparatus, device and medium for message processing.

BACKGROUND

In an instant messaging (IM) software, message forwarding is a common way to achieve message synchronization and message sharing. In order to improve the efficiency of message forwarding, a combining and forwarding manner is proposed, that is, a user may select multiple messages that need to be forwarded at one time, and then combine the multiple messages into one message for forwarding by the combining and forwarding manner.

However, the processing mode of combining and forwarding is to copy the text content of the original message to present in a combining and forwarding record page. This processing mode results in combining and forwarding only supporting the display of static text messages, and may not render dynamically changeable messages, thereby affecting the display effect and reducing communication efficiency.

SUMMARY

In view of this, embodiments of the present application provide a method, apparatus, device and medium for message processing to realize dynamic rendering of a card message that is changeable dynamically for combining and forwarding, so that the card message may be displayed in a target conversation based on a display style in a source conversation.

In order to achieve the above purposes, the technical solutions provided by the embodiments of the present application are as follows:

In a first aspect of embodiments of the present application, a method of message processing is provided and the method may include:
  receiving a forwarded message sent in a combining and forwarding manner, the forwarded message comprising a card message, a content of the card message being changeable dynamically; and
  displaying, in a target conversation, the card message based on a display style of the card message in a source conversation.

In a second aspect of embodiments of the present application, an apparatus for message processing device is provided and the apparatus may include:
  a receiving unit configured to receive a forwarded message sent in a combining and forwarding manner, the forwarded message comprising a card message, a content of the card message being changeable dynamically; and
  a displaying unit configured to display, in a target conversation, the card message based on a display style of the card message in a source conversation.

In a third aspect of embodiments of the present application, an electronic device is provided and the device includes: a processor and a memory;
  the memory being configured to store an instruction or a computer program; and
  the processor being configured to execute the instruction or computer program in the memory, to cause the electronic device to perform the method of message processing of the first aspect.

In a fourth aspect of embodiments of the present application, a computer-readable storage medium is provided. The computer-readable storage medium has an instruction stored thereon, that the instruction, when run on a device, causing the device to perform the method of message processing of the first aspect.

In a fifth aspect of embodiments of the present application, a computer program product is provided. When the computer program product is run on a computer, the computer is enabled to perform the method of message processing of the first aspect.

It can be seen that the embodiments of the present application have the following beneficial effects:

In the embodiments of the present application, when the forwarded message formed by the combining and forwarding manner is forwarded from the source conversation to the target conversation, and when the card message in the forwarded message is displayed in the target conversation, the display style of the card message in the source conversation is determined. After determining the display style of the card message in the source conversation, the card message is displayed in the target conversation based on the display style. That is, in embodiments of the present application, the display style of the card message in the source conversation is obtained, and then the card message is rendered in the target conversation based on the display style, so that the display effects of the card message by combining and forwarding and the card message in the source conversation is maintained consistent, thereby improving rendering effects and user experience, and improving communication efficiency.

BRIEF DESCRIPTION OF THE DRAWINGS

In order to more clearly illustrate the technical solutions in the embodiments or related technologies of the present application, the drawings that need to be used in the description of the embodiments or related technologies will be briefly introduced below. It is obvious that the accompanying drawings described below are only some embodiments recorded in this application. For those skilled in the art, other drawings may be obtained based on these drawings without creative labor.

DETAILED DESCRIPTION

In order to enable the personnel of this field to better understand the solution of the present application, the technical solutions in the embodiments of the present application will be clearly and completely described below in conjunction with the drawings in the embodiments of the present application. Obviously, the described embodiments are only a part of embodiments of the present application rather than all embodiments. Based on the embodiments in the present application, all other embodiments obtained by those of ordinary skill in the art without creative efforts fall within the scope of protection of the present application.

Figure 1A:
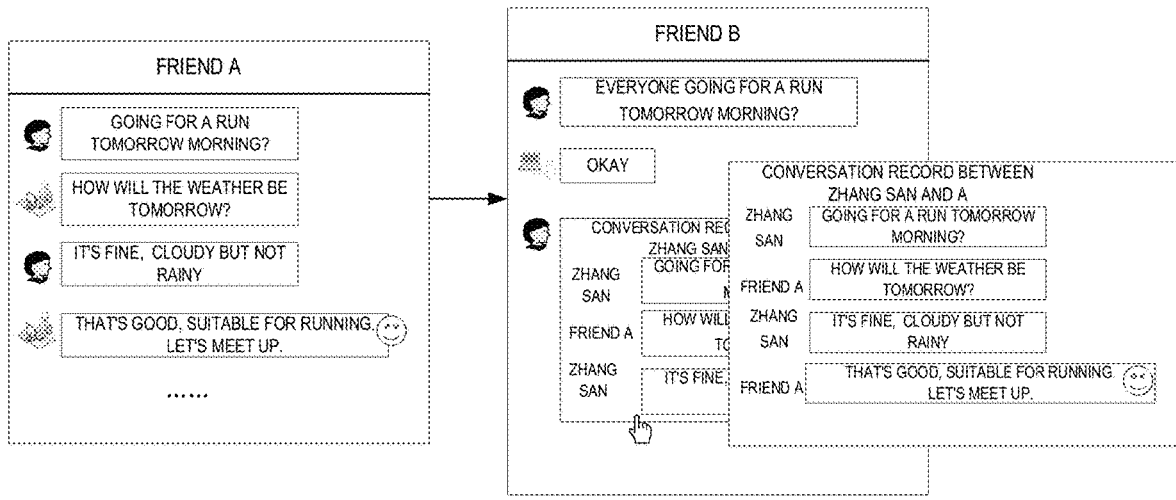
FIG. 1a is a schematic diagram of a display of a combined and forwarded message.

Combining and forwarding acts as a common message delivery way in IM communication software and its function is to completely present the message selected by a user to a recipient in a way that retains information of the original sender. As shown in FIG. 1a, the user forwards a plurality of messages in conversation 1 to conversation 2 in a combining and forwarding manner, and the forwarded message in conversation 2 are displayed as a static text message. When the user clicks on the forwarded message in conversation 2, all messages will be fully displayed through a separate page.

Figure 1B:
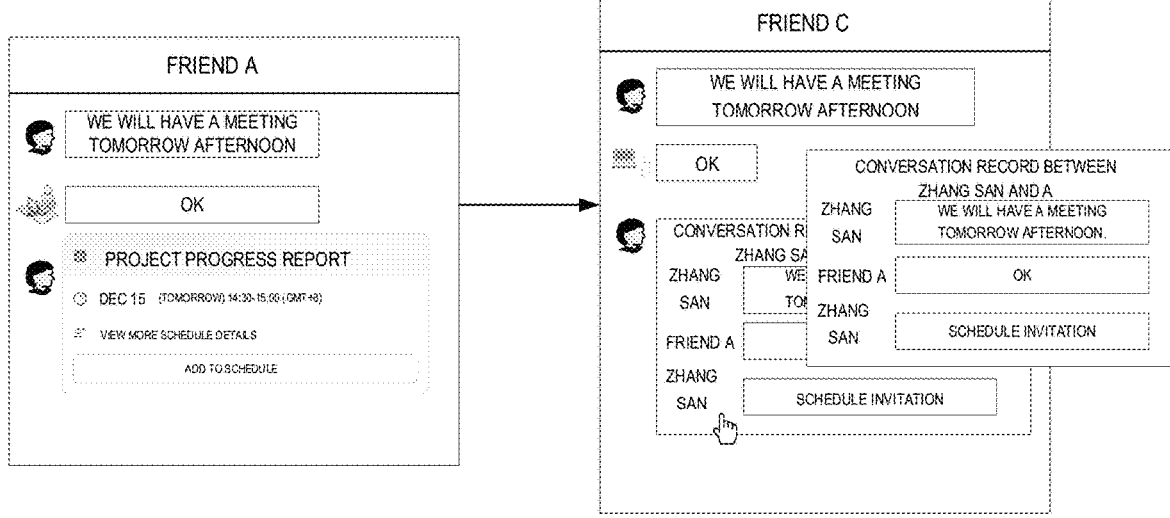
FIG. 1b is a schematic diagram a display of a card message in combined and forwarded messages.

However, the current combining and forwarding manner only supports the display of static rich text messages and does not support the display of the card message that is changeable dynamically, and may only display text content, making it impossible to render the actual display mode of the card message in combining and forwarding, which affects the display effect. For example, as shown in FIG. 1b, the combined and forwarded message includes a schedule invitation card. When the schedule invitation card is forwarded from the source conversation to the target conversation in the combining and forwarding manner, it may only be displayed through text that the forwarded message includes the schedule invitation card and may not be rendered through the specific presentation form of the schedule invitation card.

Currently, when the card message in the source conversation is forwarded to the target conversation in the combining and forwarding manner, a new message identifier will be assigned to the card message and a new display style will be configured for the card message. The new message identifier is different from the message identifier of the card message in the source conversation, and the new display style is also different from the display style of the card message in the source conversation. When the forwarded card message is displayed in the target conversation, the corresponding new display style will be found from a server based on the new message identifier, and then the new display style will be used to render and display the card message, so that display effect of the card message in the target conversation is inconsistent with its display in the source conversation.

Based on this, embodiments of the present application provide a method of message displaying. Specifically, after receiving the combined and forwarded card message in the target conversation, the display style of the merged and forwarded card message in the source conversation is obtained, and the card message forwarded to the target conversation is rendered and displayed based on the display style, so that the display effect of the card message in combining and forwarding is consistent with the display effect of the card messages in the source conversation.

It should be noted that the card message in this embodiment refers to the content to be shared in the form of a card (to achieve content aggregation), and the content presented by the card may change dynamically. Further, the card may also include operable buttons.

In order to facilitate understanding of the technical solution provided by the embodiments of the present application, the following will be described in conjunction with the accompanying drawings.

Figure 2:
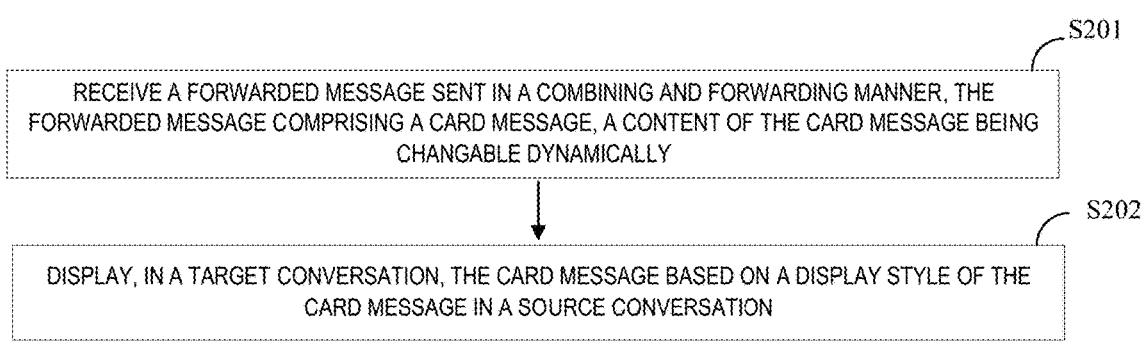
FIG. 2 is a flowchart of a method of message processing provided by embodiments of the present application.

Refer to FIG. 2, which is a flowchart of a method of message processing provided by embodiments of the present application. As shown in FIG. 2, this method can be executed by a message display device. The message display device may be an electronic device or other devices, which are not limited here. The electronic devices may include mobile phones, tablet computers, desktop computers, laptops, vehicle-mounted terminals, wearable electronic devices, integrated machines, smart home devices and other devices with communication functions, or may be devices simulated by virtual machines or simulators.

Specifically, the method of message processing shown in FIG. 2 may include:

S201: receive a forwarded message sent in a combining and forwarding manner, the forwarded message comprising a card message.

In this embodiment, when one or more messages selected by the user from the source conversation are forwarded in the combining and forwarding manner, after receiving the combining and forwarding instruction triggered by the user, the selected message or multiple messages are combined into one forwarded message. In response to the target conversation selected by the user, the forwarded message is sent to the target conversation, so that after receiving the forwarded message in the target conversation, the forwarded message is displayed in the target conversation.

The forwarded message includes a card message, and the card message may dynamically change based on a trigger operation of the user. Specifically, the card message presents the information aggregated by the card in the form of a card, which may include, for example, the card title, the card content, etc. The card message may be a schedule card, a task card, and the like in office suite applications. The office suite applications usually integrate instant messaging applications as well as one or more of applications such as schedules, tasks, cloud documents, audio and video conferencing, etc.

S203: display, in a target conversation, the card message based on a display style of the card message in a source conversation.

After sending the forwarded message to the target conversation, the application where the target conversation is located may determine the display style of the card message in the forwarded message in the source conversation, and then render the card message in the forwarded message based on the display style, so that the card message is displayed in the target conversation according to the display style.

Determining the display style of the card message in the forwarded message in the source conversation may be achieved in the following ways:

(1): determining a message identifier corresponding to the card message, the message identifier being the identifier of the card message in the source conversation.

(2): determining the display style of the card message in the source conversation based on the message identifier and a corresponding relation, the corresponding relation including the message identifier and the display style.

In this embodiment, in order to ensure that the display effect of the card message in the target conversation is consistent with the display effect in the source conversation, the message identifier corresponding to the card message in the source conversation is determined as the message identifier forwarded to the card message in the target conversation and thus the card message in the source conversation is associated with the card message in the forwarded message. After obtaining the message identifier corresponding to the card message, the display style of the card message in the source conversation is determined based on the message identifier and the pre-established corresponding relation. The corresponding relation includes the message identifier and the display style. Specifically, the display style of the card message indicated by the message identifier is searched based on the message identifier and the corresponding relation. That is, in this embodiment, the card message in the source conversation and the card message in the forwarded message correspond to the same message identifier. The message identifier is used to uniquely indicate the above card message in the system. When displaying the card message in the forwarded message in the target conversation, the message identifier may be used to query the server for the corresponding message content and display style, and then the card message is displayed in the target conversation based on the message content and display style.

After a first user in the target conversation triggers the forwarded message, in response to the triggering operation by the first user, the above operation of determining the message identifier corresponding to the card message in the source conversation may be performed. If the first user does not trigger the forwarded message in the target conversation, the card message in the forwarded message may be displayed in the form of text.

(3): Rendering, in the target conversation, the card message based on the display style, to cause the card message to be displayed in the target conversation in the display style.

After determining the display style of the card message in the source conversation, the card message is rendered in the target conversation based on the display style, so that the card message is displayed in the target conversation in the display style and the display style of the card message in the target conversation is consistent with that in the source conversation. Specifically, when rendering the card message in the forwarded message based on the display style, the card message will be rendered in a conversation record page corresponding to the forwarded message, so as to display the specific form of the card message in the conversation record page.

Figure 3A:
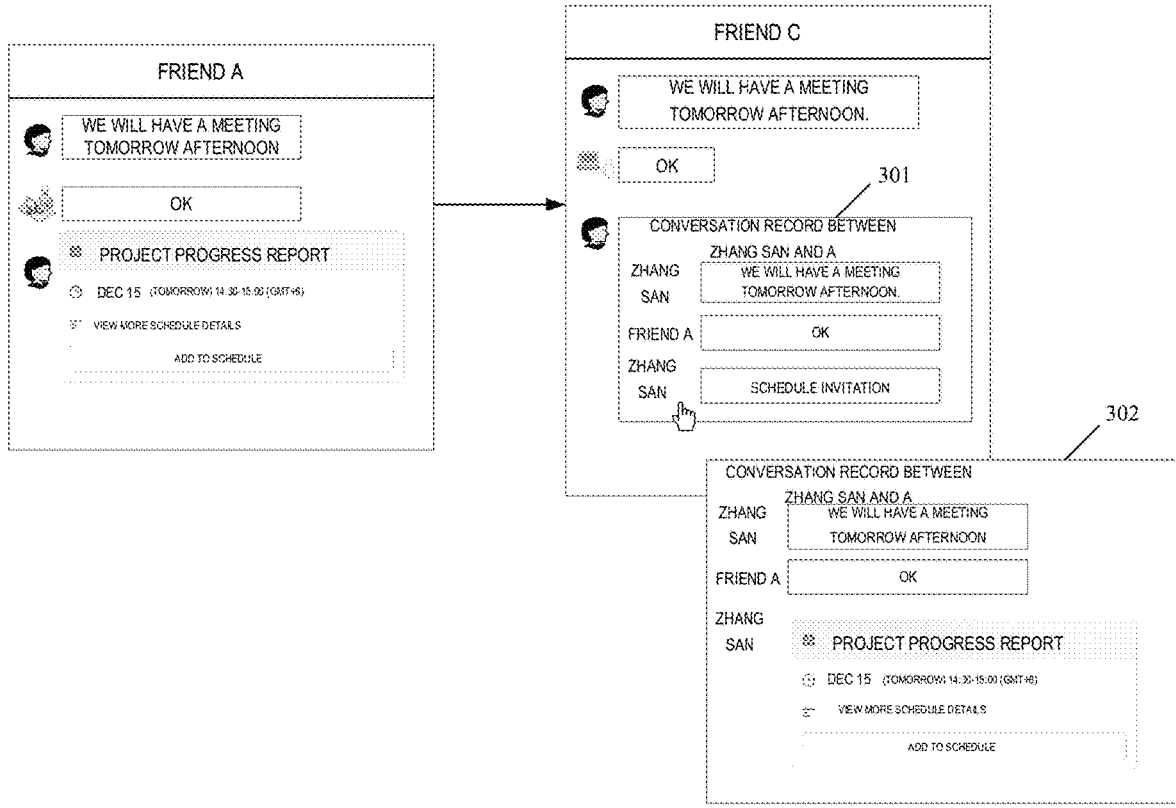
FIG. 3a is a schematic diagram of a display of a card message provided by embodiments of the present application.

For example, as shown in FIG. 3a, the target conversation includes a forwarded message 301. When the first user clicks the forwarded message 301, all information may be displayed through a record page 302 corresponding to the forwarded message, and the card message may be rendered in this page, so that the display effect of the card message is consistent with the display effect in the source conversation.

It can be seen that when the forwarded message formed in the combining and forwarding manner is forwarded from the source conversation to the target conversation and the card message in the forwarded message is displayed, the card message will be rendered based on the display style of the card message in the source conversation, so that the card message is displayed in the target conversation according to the display style, and thus the display effect of the card message which is combined and forwarded is consistent with the card message in the source conversation, and the rendering effect and user experience are improved.

In practical applications, in order to take into account both user experience and information security, when rendering the card message, different data pages may be presented based on permissions of different viewers on the card message, so that the information that each viewer may view does not exceed their own permissions.

Based on this, when rendering the card message in the target conversation based on the display style, in response to triggering, by a first user in the target conversation, on the forwarded message in the target conversation, a permission of the first user for the card message is determined. The card message is displayed in the target conversation displayed by a client of the first user, based on the permission and the display style. The permission includes a viewing permission and an operation permission. The viewing permission refers to the ability of the first user to view the basic information (the first information) corresponding to the card message, such as the card title corresponding to the card message, the time information corresponding to the card, and information of the user who creates the card. The operation permission refers to the ability of the first user to trigger the operation components displayed in the card.

It should be noted that usually the card message in the forwarded message will not be displayed directly in the target conversation but will be displayed in the conversation record page corresponding to the forwarded message after the first user triggers the forwarded message. Therefore, the client of the first user will render the card message in the conversation record page corresponding to the forwarded message in the target conversation displayed by the client of the first user, so that the card message is displayed in the target conversation in the display style.

Figure 3B:
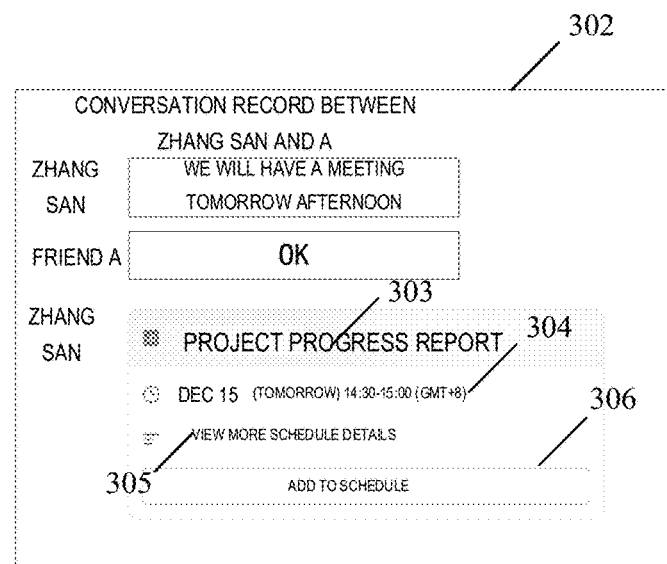
FIG. 3b is a schematic diagram of a display of a card message in a conversation record page provided by embodiments of the present application.

Optionally, in response to the first user having the viewing permission, first information comprised in the card message is displayed in a conversation record page corresponding to the forwarded message in the target conversation displayed by the client of the first user, based on the display style. The first message includes a card title, time information corresponding to a card, information of a user creating the card, etc. For example, as shown in FIG. 3b, taking the card message as a schedule invitation card as an example, the schedule invitation presented in the conversation record page 302 includes a title 303 and a specific implementation time 304 of the schedule.

Specifically, when rendering the card message in the conversation record page corresponding to the forwarded message, a first component and a second component corresponding to the card message may also be rendered. The first component may be used to view the complete information in the card message, and the second component may be used to add users with the operation permission to the event indicated by the card message. For example, in FIG. 3b, the first component is the viewing details component 305, and the second component is the adding to schedule component 306.

Figure 3C:
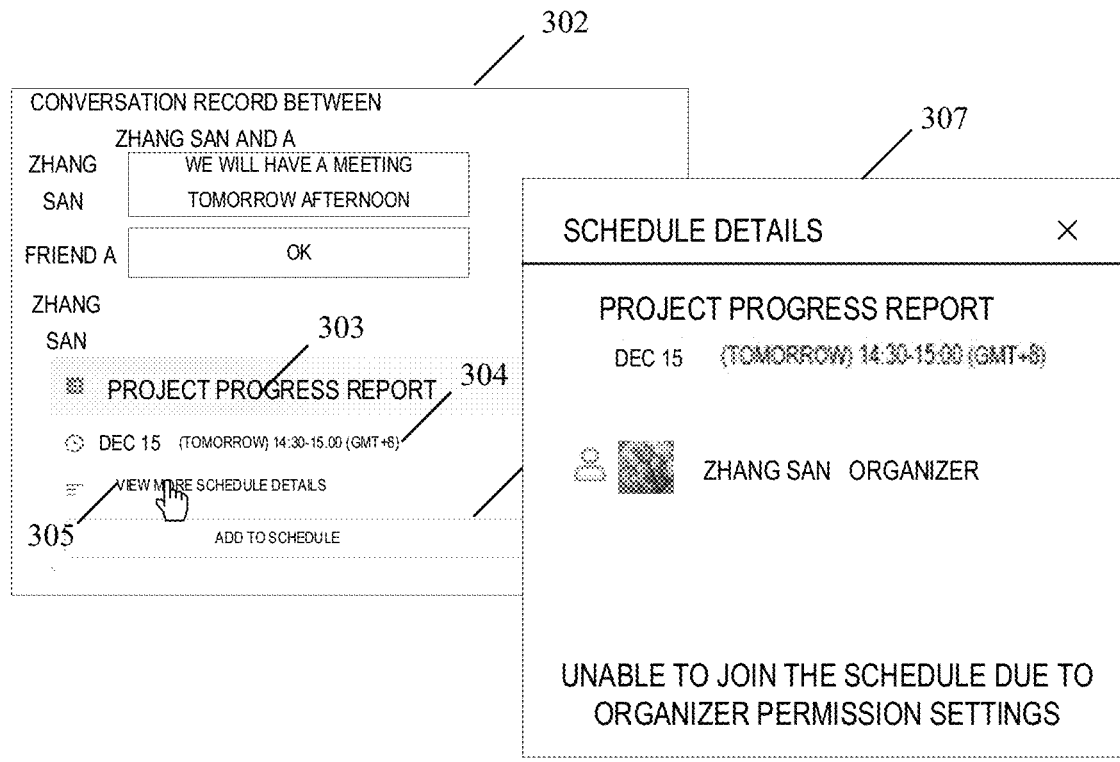
FIG. 3c is a schematic diagram of a display of a card message with viewing permission provided by the embodiments of the present application.

After the first user triggers the first component, the first information is displayed using a predetermined page. Because the first user only has the viewing permission, only the first information is displayed on the first predetermined page. For example, as shown in FIG. 3c, in response to the triggering operation by the first user on the viewing details component 305, the schedule title, schedule time, and information (including user avatar, user name, etc.) of the user who creates the schedule are displayed through the schedule details page 307 in the target conversation displayed on the client of the first user.

Figure 3D:
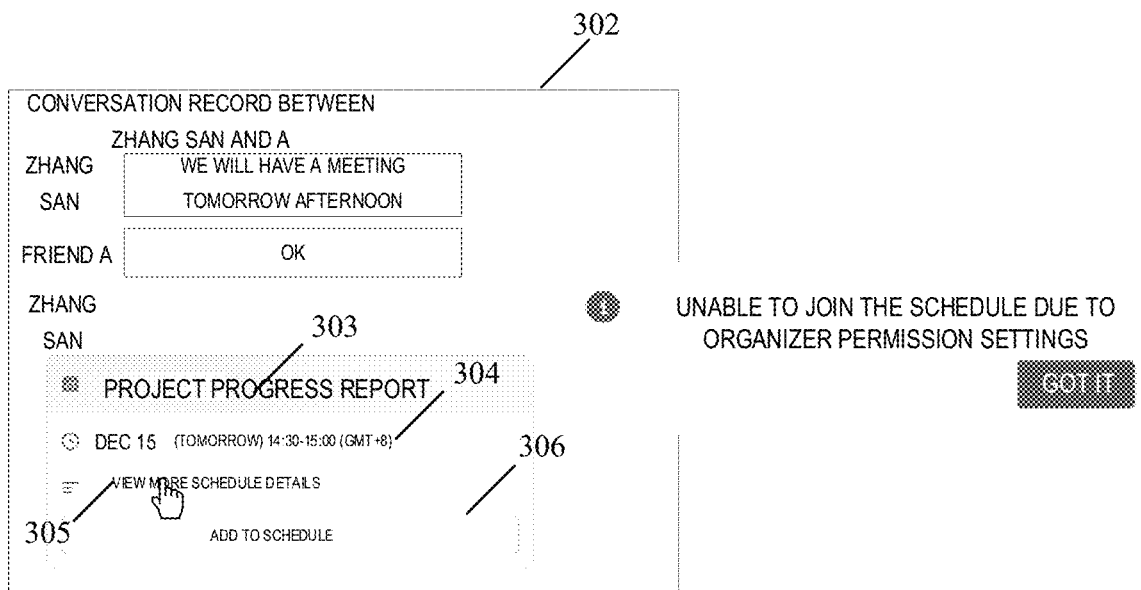
FIG. 3d is a schematic diagram of a result of operating a card message provided by embodiments of the present application.

Further, in response to triggering, by the first user, on a second component in the card message, a prompt message is displayed, where the prompt message is used to prompt the first user has no permission to perform operations. As shown in FIG. 3d, if the first user directly clicks the adding to schedule component 306 in the card message, a prompt message will be displayed in a pop-up window.

Optionally, in response to the first user having the operation permission and performing triggering on a second component in the card message, the first user is determined as a participant of an event indicated by the card message.

Figure 4A:
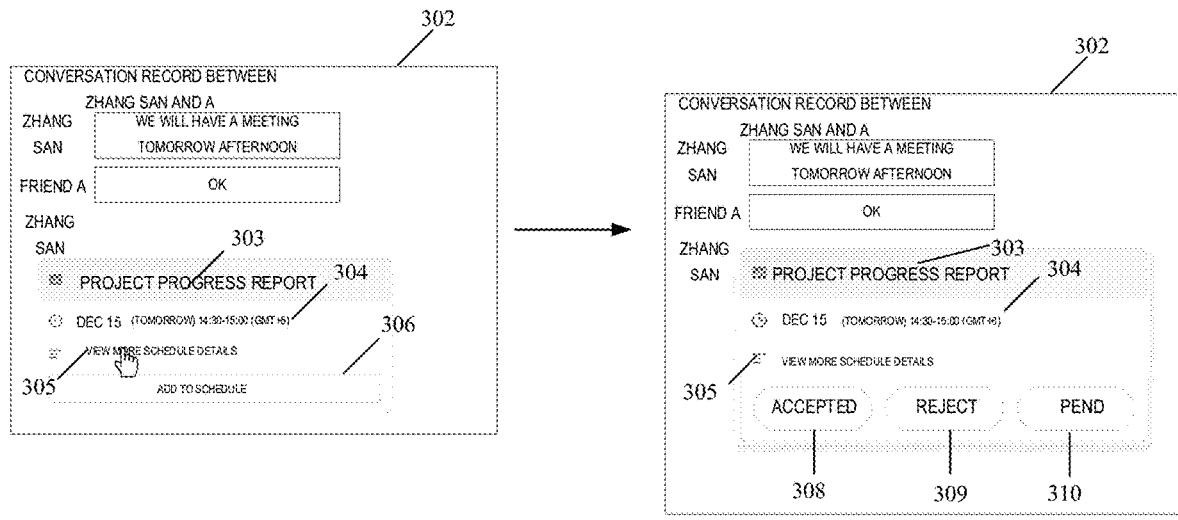
FIG. 4a is a schematic diagram of a display of joining schedule provided by embodiments of the present application.

Further, after the first user is determined to be a participant of the event indicated by the card message, the card message in the conversation record page corresponding to the forwarded message is updated. That is, after the first user is determined to be a participant of the event indicated by the card message, the content presented in the card message may change, and the card message is updated based on the change. For example, as shown in FIG. 4a, the first user becomes a participant of the schedule by clicking on the adding to schedule component 306, the card message in the conversation record page no longer displays the adding to schedule component 306, but displays other triggerable components, such as the accepted component. 308, pending component 309, rejecting component 310, etc.

Figure 4B:
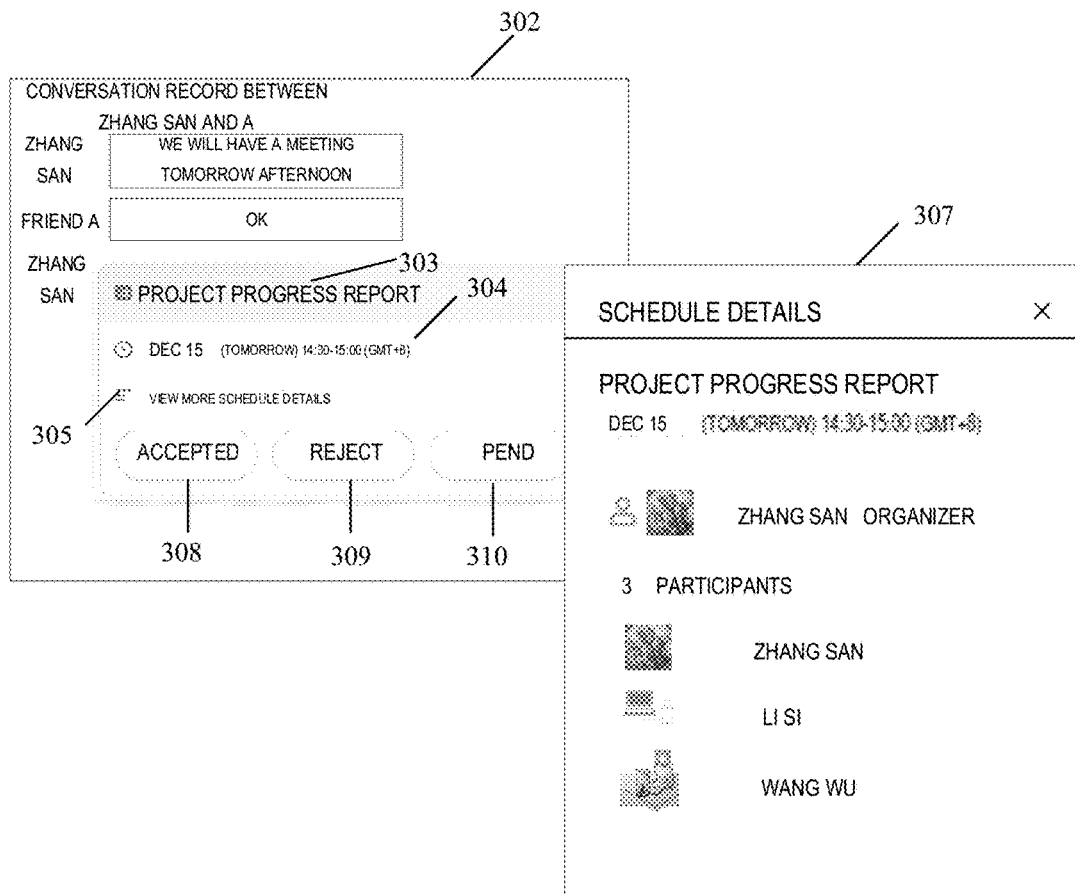
FIG. 4b is a schematic diagram of another display of joining schedule provided by embodiments of the present application.

When the first user acts as a participant of the event indicated by the card message, in response to triggering, by the first user, on a first component in the card message, a first message and a second message comprised in the card message are displayed using a predetermined page. The second message may include information of respective participants of the event indicated by the card message and other more detailed information. For example, as shown in FIG. 4b, the first user clicks the viewing details component 305 to enter the schedule details page, and the complete schedule information is displayed on the schedule details page.

Optionally, in response to a change of the card message in the source conversation, the display style is updated to update the card message in the target conversation, so that the updated card message may be displayed in the conversation record page corresponding to the forwarded message. That is, when the card message in the source conversation changes, the display style stored in the server will be updated. When displaying the card information in the target conversation later, a request may be made to the server based on the message identifier corresponding to the card message and corresponding relation to find the corresponding message content and the corresponding updated display style, and then the card message is render and display based on the message content and the updated display style.

Optionally, in response to a change of the card message in the target conversation, the display style is updated to update the card message in the source conversation, so that the source conversation displays the updated card message. That is, when the card message changes in the target conversation, the display style stored on the server side will be updated. When displaying the card information in the source conversation later, a request may be made to the server based on the message identifier corresponding to the card message and corresponding relation to find the corresponding message content and the corresponding updated display style, and then the card message is render and display based on the message content and the updated display style.

The change of the card message comprises a change in at least one of a card title, a card content or a card status. The card status is used to indicate that the event indicated by the card message is in different states. For different card information, the divided status types may be different, and this embodiment is not limited in this regard. For example, a schedule card may be divided into valid status and canceled status; a task card may be divided into ongoing, completed, etc. When the card status changes, its corresponding rendering method changes, causing the card message itself to change. For example, a valid schedule card is rendered in orange, and a canceled schedule card is rendered in gray.

In this embodiments, whether the user operates on the card message in the source conversation or on the card message in the target conversation, the operation results will be synchronized to the other conversation, so that both parties maintain consistent display effects.

Based on the above method embodiments, embodiments of the present application provides an apparatus for message processing and an electronic device, which will be described below with reference to the accompanying drawings.

Figure 5:
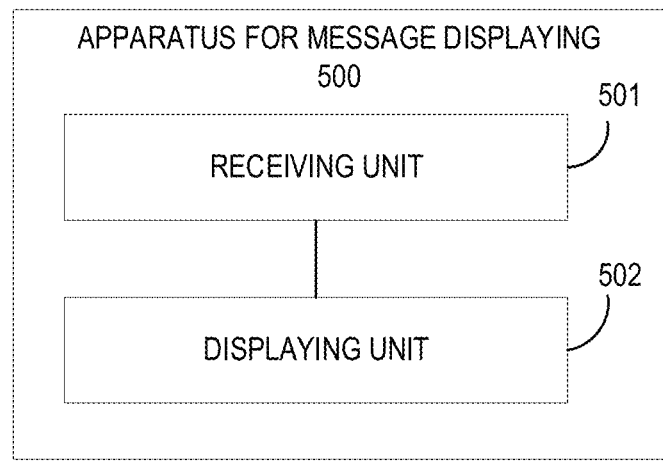
FIG. 5 is a schematic structural diagram of an apparatus for message processing provided by embodiments of the present application.

Referring to FIG. 5, which is a structural diagram of an apparatus for message displaying provided by embodiments of the present application. As shown in FIG. 5, the apparatus 500 may include: a receiving unit 501 and a displaying unit 502.

The receiving unit 501 is configured to receive a forwarded message sent in a combining and forwarding manner, the forwarded message comprising a card message, a content of the card message being changeable dynamically.

The displaying unit 502 is configured to display, in atarget conversation, the card message based on a display style of the card message in a source conversation.

In a specific implementation, the displaying unit 502 is specifically configured to determine a message identifier corresponding to the card message, the message identifier being an identifier of the card message in the source conversation; determine the display style of the card message in the source conversation, based on the message identifier and a corresponding relation, the corresponding relation comprising the message identifier and the display style; and render, in the target conversation, the card message based on the display style, to cause the card message to be displayed in the target conversation in the display style.

In a specific implementation, the displaying unit 502 is specifically configured to, in response to triggering, by a first user in the target conversation, on the forwarded message in the target conversation, determine a permission of the first user for the card message, the permission comprising a viewing permission and an operation permission; and display the card message in the target conversation displayed by a client of the first user, based on the permission and the display style of the card message in the source conversation.

In a specific implementation, the displaying unit 502 is specifically configured to display the card message in a conversation record page corresponding to the forwarded message in the target conversation displayed by the client of the first user, based on the permission and the display style of the card message in the source conversation.

In a specific implementation, the displaying unit 502 is specifically configured to, in response to the first user having the viewing permission, display first information comprised in the card message in a conversation record page corresponding to the forwarded message in the target conversation displayed by the client of the first user, based on the display style of the card message in the source conversation, the first information comprising at least one of a card title, time information corresponding to a card or information of a user creating the card.

In a specific implementation, the displaying unit 502 is specifically configured to, in response to triggering, by the first user, on a first component in the card message, display the first information, using a predetermined page.

In a specific implementation, the displaying unit 502 is further configured to, in response to triggering, by the first user, on a second component in the card message, display a prompt message for prompting that the first user has no permission to perform operations.

In a specific implementation, the apparatus further includes: an adding unit.

The adding unit is configured to in response to the first user having the operation permission and performing triggering on a second component in the card message, determine the first user as a participant of an event indicated by the card message.

In a specific implementation, the apparatus further includes: an updating unit.

The updating unit is configured to in response to determining the first user as the participant of the event indicated by the card message, update the card message in the conversation record page corresponding to the forwarded message.

In a specific implementation, the displaying unit 502 is further configured to, in response to triggering, by the first user, on a first component in the card message, display, using a predetermined page, a first message and a second message comprised in the card message, the second message comprising information of respective participants of the event indicated by the card message.

In a specific implementation, the apparatus further includes: the updating unit.

The updating unit is configured to, in response to a change of the card message in the source conversation, update the display style to update the card message in the target conversation; or
 the update unit is configured to, in response to a change of the card message in the target conversation, update the display style to update the card message in the source conversation.

In a specific implementation, the change of the card message comprises a change in at least one of a card title, a card content or a card status.

In a specific implementation, the card message comprises a schedule card message and a task card message. That is, in some embodiments, the card message may be a schedule card message, and in other embodiments, the card message may be a task card message.

It should be noted that the specific implementation of each unit in this embodiment can be found in the above method embodiments, and this embodiment will not be described in detail here.

Figure 6:
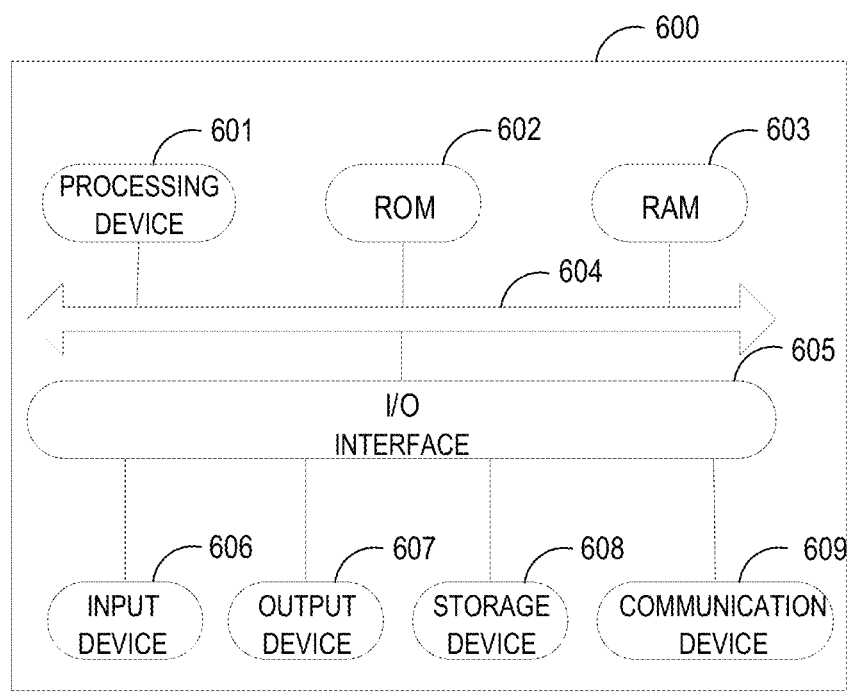
FIG. 6 is a schematic structural diagram of an electronic device provided by embodiments of the present application.

Referring to FIG. 6, which illustrates a schematic structural diagram of an electronic device 600 adapted to implements embodiments of the present application. The terminal devices according to the embodiments of the present application may include, but are not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 6 is only an example, and should not be construed as limiting the function and scope of use of the embodiments of the present application.

As illustrated in FIG. 6, the electronic device 600 may include a processing device (such as a central processing unit, a graphics processing unit, etc.) 601, which may perform various appropriate actions and processes in accordance with programs stored in a read only memory (ROM) 602 or loaded from a storage device 608 into a random access memory (RAM) 603. In the RAM 603, various programs and data required for the operation of the electronic device 600 may also be stored. The processing device 601, the ROM 602, and the RAM 603 are connected to each other through a bus 604. An input/output (I/O) interface 605 is also connected to the bus 604.

Generally, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, and the like; a storage device 608 including, for example, magnetic tape, hard disk, etc.; and a communication device 609. The communication device 609 may allow the electronic device 600 to perform wireless or wired communication with other devices for data exchange. Although FIG. 6 illustrates the electronic device 600 having various devices, it should be understood that it is not necessary to implement or provide all the illustrated devices. Alternatively, more or fewer devices may be implemented or provided.

In particular, according to an embodiment of the present application, the processes described above with reference to the flowcharts may be implemented as computer software programs. For example, an embodiment of the present application includes a computer program product, which includes a computer program carried on a non-transient computer-readable medium. The computer program includes program codes for implementing the method illustrated in any of the flowcharts. In these embodiments, the computer program may be downloaded and installed from a network through the communication device 609, or installed from the storage device 608, or installed from the ROM 602.

The computer program, when executed by the processing device 601, implements the above-mentioned functions defined in the method according to the embodiments of the present application.

The electronic device provided by the embodiments of the present application and the method of message processing provided by the above embodiments belong to the same inventive concept.

Technical details that are not described in detail in this embodiment can be found in the above embodiments, and this embodiment has the same beneficial effects as the above embodiments.

Embodiments of the present application provide a computer-readable medium on which a computer program is stored. When the program is executed by a processor, the method of message processing described in any of the above embodiments is implemented.

It is to be noted that the above computer-readable medium in the present application may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a random access memory (RAM), a read only memory (ROM), an erasable programmable read only memory (EPROM) or a flash memory, an optical fiber, a compact disc read-only memory (CD-ROM), an optical storage device, a magnetic storage device, or any suitable combination thereof. In the present application, the computer-readable storage medium may be any tangible medium including or storing programs, which may be used by or used with an instruction execution system, apparatus, or device. However, in the present application, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and server may communicate using any currently known or future developed network protocol such as HTTP (HyperText Transfer Protocol), and can communicate with digital data in any form or medium. Communications (e.g., communications networks) interconnections. Examples of communications networks include local area networks ("LAN"), wide area networks ("WAN"), the Internet (e.g., the Internet), and end-to-end networks (e.g., ad hoc end-to-end networks), as well as any currently known or developed in the future network of.

The above-mentioned computer readable medium may be contained in the above-mentioned electronic device or may be standalone without being assembled into the electronic device.

The computer-readable medium carries one or more programs. When the one or more programs are executed by the electronic device, the electronic device executes the method of message processing.

The computer program codes for implementing the operations of the present application may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present application. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The units involved in the embodiments described in this application may be implemented in software or hardware. The name of the unit/module does not constitute a limitation on the unit itself under certain circumstances. For example, the voice data collection module can also be described as a "data collection module".

The functions described herein above may be performed, at least in part, by one or more hardware logic components. For example, without limitation, exemplary types of suitable hardware logic components include a field programmable gate array (FPGA), an application specific integrated circuit (ASIC), an application specific standard product (ASSP), a system on chip (SOC), a complex programmable logic device (CPLD), and the like.

In the context of this application, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a random access memory (RAM), a read only memory (ROM), an erasable programmable read only memory (EPROM) or flash memory, an optical fiber, a compact disc read only memory (CD-ROM), an optical storage device, a magnetic storage device, or any suitable combination thereof.

It should be noted that the embodiments in the specification are described in a progressive manner, with the emphasis of each of the embodiments on the difference from other embodiments. For the same or similar parts between the embodiments, reference may be made one to another. Since the device disclosed in the embodiments corresponds to the method disclosed in the embodiments, the description for the system or the device is simple, and reference may be made to the method embodiments for the relevant parts.

It should be understood that in the present application, "at least one (item)" refers to one or more, and "a plurality of" refers to two or more. "And/or" is used to describe the relationship between associated objects, indicating that there may be three relationships. For example, "A and/or B" may mean: only A exists, only B exists, and A and B exist simultaneously, where A and B may be singular or plural. The character "/" generally indicates that the related objects are in an "or" relationship. "At least one of the following" or similar expressions thereof refers to any combination of these items, including any combination of a single item (items) or a plurality of items (items). For example, at least one item (item) of a, b or c can mean: a, b, c, "a and b", "a and c", "b and c", or "a and b and c", where a, b, c may be single or multiple.

It should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) a . . . " does not exclude the case that other similar elements may exist in the process, method, article or device.

Steps of the method or the algorithm described in conjunction with the embodiments disclosed herein may be implemented directly with hardware, a software module executed by a processor or a combination thereof. The software module may be provided in a Random Access Memory (RAM), a memory, a Read Only Memory (ROM), an electrically-erasable ROM, an electrically erasable programmable ROM, a register, a hard disk, a removable disk, a CD-ROM, or a storage medium in any other forms known in the art.

The above description of the embodiments enables those skilled in the art to implement or use the present disclosure. Multiple modifications to these embodiments are apparent to those skilled in the art, and the general principle defined herein may be implemented in other embodiments without deviating from the spirit or scope of the present disclosure. Therefore, the present disclosure is not limited to these embodiments described herein, and conforms to the widest scope consistent with the principle and novel features disclosed herein.

We claim:

1. A method of message processing, comprising:
receiving a forwarded message sent in a combining and forwarding manner from a source conversation for instant messaging, the forwarded message comprising a card message, a content of the card message being changeable dynamically; and
displaying, in a target conversation, the card message based on a display style of the card message in the source conversation,
wherein the displaying, in the target conversation, the card message based on the display style of the card message in a source conversation comprises:
in response to triggering, by a first user in the target conversation, on the forwarded message in the target conversation, determining a permission of the first user for the card message, the permission comprising a viewing permission and an operation permission; and
displaying the card message in the target conversation displayed by a client of the first user, based on the permission and the display style of the card message in the source conversation.

2. The method of claim 1, wherein the displaying, in the target conversation, the card message based on the display style of the card message in the source conversation comprises:
obtaining a message identifier corresponding to the card message, the message identifier being an identifier of the card message in the source conversation;
determining the display style of the card message in the source conversation, based on the message identifier and a corresponding relation, the corresponding relation comprising the message identifier and the display style; and
rendering, in the target conversation, the card message based on the display style, to cause the card message to be displayed in the target conversation in the display style.

3. The method of claim 1, wherein the displaying the card message in the target conversation displayed by a client of the first user, based on the permission and the display style of the card message in the source conversation comprises:
displaying the card message in a conversation record page corresponding to the forwarded message in the target conversation displayed by the client of the first user, based on the permission and the display style of the card message in the source conversation.

4. The method of claim 1, wherein the displaying the card message in the target conversation displayed by a client of the first user, based on the permission and the display style of the card message in the source conversation comprises:
in response to the first user having the viewing permission, displaying first information comprised in the card message in a conversation record page corresponding to the forwarded message in the target conversation displayed by the client of the first user, based on the display style of the card message in the source conversation, the first information comprising at least one of a card title, time information corresponding to a card or information of a user creating the card.

5. The method of claim 4, further comprising:
in response to triggering, by the first user, on a first component in the card message, displaying the first information, using a predetermined page.

6. The method of claim 5, further comprising:
in response to triggering, by the first user, on a second component in the card message, displaying a prompt message for prompting that the first user has no permission to perform operations.

7. The method of claim 1, further comprising:
in response to the first user having the operation permission and performing triggering on a second component in the card message, determining the first user as a participant of an event indicated by the card message.

8. The method of claim 7, further comprising:
in response to determining the first user as the participant of the event indicated by the card message, updating the card message in a conversation record page corresponding to the forwarded message.

9. The method of claim 7, further comprising:
in response to triggering, by the first user, on a first component in the card message, displaying, using a predetermined page, a first message and a second message comprised in the card message, the second message comprising information of respective participants of the event indicated by the card message.

10. The method of claim 1, further comprising:
in response to a change of the card message in the source conversation, updating the display style to update the card message in the target conversation; or
in response to a change of the card message in the target conversation, updating the display style to update the card message in the source conversation.

11. The method of claim 10, wherein the change of the card message comprises a change in at least one of a card title, a card content or a card status.

12. The method of claim 1, wherein the card message comprises a schedule card message and a task card message.

13. An electronic device, comprising: a processor and a memory;
the memory being configured to store an instruction or a computer program; and
the processor being configured to execute the instruction or computer program in the memory, to cause the electronic device to perform operations comprising:
receiving a forwarded message sent in a combining and forwarding manner from a source conversation for instant messaging, the forwarded message comprising a card message, a content of the card message being changeable dynamically; and
displaying, in a target conversation, the card message based on a display style of the card message in the source conversation,
the displaying, in the target conversation, the card message based on the display style of the card message in the source conversation comprises:
in response to triggering, by a first user in the target conversation, on the forwarded message in the target conversation, determining a permission of the first user for the card message, the permission comprising a viewing permission and an operation permission; and
displaying the card message in the target conversation displayed by a client of the first user, based on the permission and the display style of the card message in the source conversation.

14. The electronic device of claim 13, wherein the displaying, in the target conversation, the card message based on the display style of the card message in the source conversation comprises:
obtaining a message identifier corresponding to the card message, the message identifier being an identifier of the card message in the source conversation;
determining the display style of the card message in the source conversation, based on the message identifier and a corresponding relation, the corresponding relation comprising the message identifier and the display style; and rendering, in the target conversation, the card message based on the display style, to cause the card message to be displayed in the target conversation in the display style.

15. The electronic device of claim 13, wherein the displaying the card message in the target conversation displayed by a client of the first user, based on the permission and the display style of the card message in the source conversation comprises:
displaying the card message in a conversation record page corresponding to the forwarded message in the target conversation displayed by the client of the first user, based on the permission and the display style of the card message in the source conversation.

16. The electronic device of claim 13, wherein the displaying the card message in the target conversation displayed by a client of the first user, based on the permission and the display style of the card message in the source conversation comprises:
in response to the first user having the viewing permission, displaying first information comprised in the card message in a conversation record page corresponding to the forwarded message in the target conversation displayed by the client of the first user, based on the display style of the card message in the source conversation, the first information comprising at least one of a card title, time information corresponding to a card or information of a user creating the card.

17. The electronic device of claim 16, the operations further comprising:
in response to triggering, by the first user, on a first component in the card message, displaying the first information, using a predetermined page.

18. A non-transitory computer-readable storage medium having an instruction stored thereon, that the instruction, when run on a device, causing the device to perform operations comprising:
receiving a forwarded message sent in a combining and forwarding manner from a source conversation for instant messaging, the forwarded message comprising a card message, a content of the card message being changeable dynamically; and
displaying, in a target conversation, the card message based on a display style of the card message in the source conversation,
the displaying, in the target conversation, the card message based on the display style of the card message in the source conversation comprises:
in response to triggering, by a first user in the target conversation, on the forwarded message in the target conversation, determining a permission of the first user for the card message, the permission comprising a viewing permission and an operation permission; and
displaying the card message in the target conversation displayed by a client of the first user, based on the permission and the display style of the card message in the source conversation.

* * * * *